United States Patent [19]
Hara et al.

[11] 4,194,812
[45] * Mar. 25, 1980

[54] ELECTROCHROMIC DEVICE

[75] Inventors: Toshitami Hara, Tokyo; Yoshioki Hajimoto, Chofu; Yoshiaki Shirato; Massaki Matsushima, both of Yokohama, all of Japan

[73] Assignee: Canon Kabushiki Kaisha Toshitama Hara, Tokyo, Japan

[*] Notice: The portion of the term of this patent subsequent to Oct. 11, 1994, has been disclaimed.

[21] Appl. No.: 701,987

[22] Filed: Jul. 2, 1976

[30] Foreign Application Priority Data

Jul. 3, 1975 [JP] Japan .................................. 50-82272

[51] Int. Cl.² .............................................. G02F 1/17
[52] U.S. Cl. ..................................................... 350/357
[58] Field of Search ........................... 350/160 R, 357

[56] References Cited

U.S. PATENT DOCUMENTS

| 3,521,941 | 7/1970 | Deb et al. | 350/160 R |
| 3,675,088 | 7/1972 | Nagasawa | 357/2 |
| 3,840,286 | 10/1974 | Kiss | 350/160 R |
| 4,009,936 | 3/1977 | Kasai | 350/160 R |
| 4,053,209 | 10/1977 | Hara et al. | 350/357 |

*Primary Examiner*—William D. Larkins
*Attorney, Agent, or Firm*—Fitzpatrick, Cella, Harper & Scinto

[57] ABSTRACT

An electrochromic device comprises an electrochromic layer comprising a transition metal compound sandwiched in between a first auxiliary electrochromic layer and a second auxiliary electrochromic layer, each of the auxiliary electrochromic layers comprising at least one metal compound containing at least one metal different from the metal in the transition metal compound in the electrochromic layer, and the difference in electronegativity between both metals being not more than 0.4.

19 Claims, 3 Drawing Figures

FIG. I
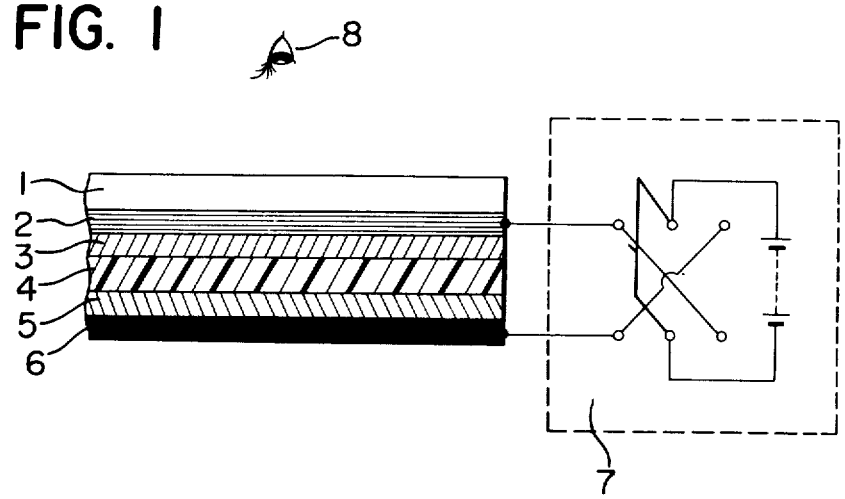
FIG. 2
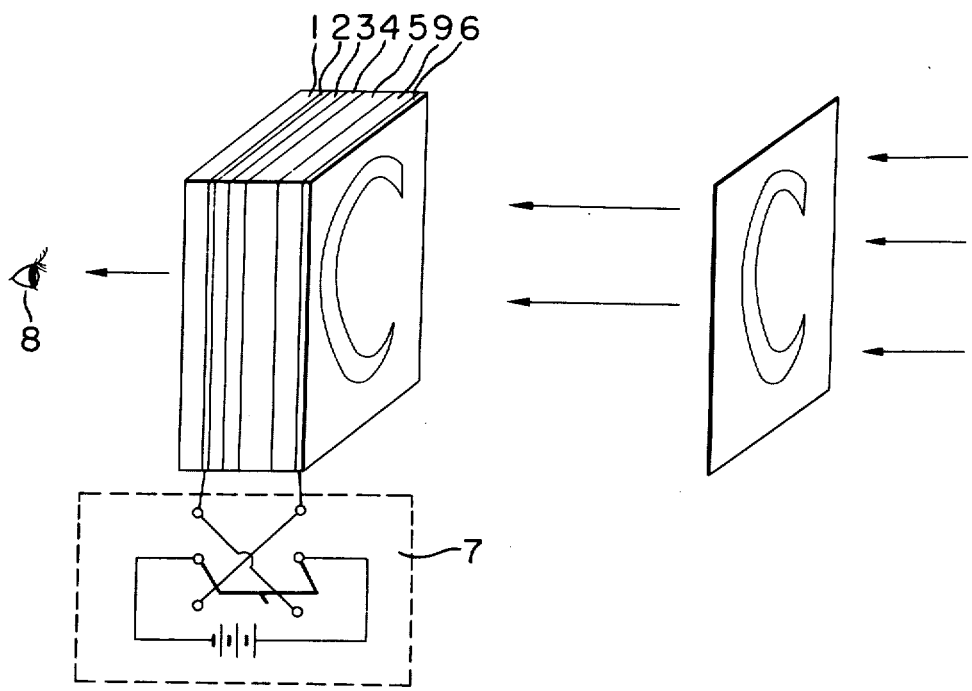

ELECTROCHROMIC DEVICE

This application contains subject matter related to U.S. Pat. No. 4,053,209, issued Oct. 11, 1977, formerly U.S. Ser. No. 635,427, filed Nov. 26, 1975.

BACKGROUND OF THE INVENTION

1. Field of the Invention

This invention relates to a display device utilizing an element which exhibits the so-called electrochromic phenomenon.

Research and development of such electrochromic elements have recently been flourishing owing to variety in the construction, the properties, for example; the persistence or memorizability thereof from the color formation (discoloration) to the disappearance of the color, availability of various materials for such element, the formed color tone of which changes in correspond to variations in applied voltage values, and so forth.

Typical examples of their application are electronic desk calculators, horological instruments and the like in which it is used as the element for indicating numerals, characters and symbols; a sign board, a meteorological chart board, a traffic sign board, an X-ray image display board and the like in which it is used as the element for displaying images; a soft facsimile display body capable of being repeatedly used by erasure as a light shutter or a facsimile signal recorder; and a writing board capable of being both inscribed and erased like an ordinary black board.

2. Description of the Prior Art

What is meant by the term "electrochromic phenomenon" is: a reversible coloring and decoloring phenomenon depending on electric polarity. The coloring (or discoloring) takes place by (1) application of electricity and the decoloring occurs by application of electricity having a polarity opposite to that of the electric current applied at the time of the abovementioned coloring or color formation, by (2) application of heat or by (3) the application of both electricity and heat. In an actual display element, however, it is possible to cause the color formation without depending on the apparent electric polarity.

The mechanism for the electrochromic phenomenon is not always simple and single. As one of several views heretofore made, the phenomenon is understood to be due to the so-called oxidation reduction reaction between an electrolyte and a color forming substance. In this case, the electrolyte and the color forming substance are not necessarily different from each other in the constituent material. In fact, there is a case in which the same substance can be the color forming substance simultaneously with the electrolyte. Also, from another aspect, there is such a view that the phenomenon takes place by variation in the light absorbing characteristic of the substance due to injection of electrons into the center of the color as is the case with photochromy. In practice, it is the result of the combination of these occurrences which is understood to be the cause of the electrochromic phenomenon.

Since the electrochromic phenomenon electrically changes a color which is possessed inherently by the material, the combination of possible colors is innumerable. Further, whether or not the material is capable of transmitting light, or whether or not it is capable of reflecting or scattering light is not determined by the property of the material itself, but is determined by the method of forming the layer. Therefore, when the material is to be used for a display devices, both light-transmission type and reflection type display device may be formed.

One of the fundamental modes of construction of the element which exhibits the electrochromic phenomenon is disclosed in U.S. Pat. No. 3,521,941 (Deb et al.). The element disclosed in this patent has a current carrier permeable insulator is laminated on an electrochromic layer using a transition metal compound such as $WO_3$, $MoO_3$ and the like and the laminate is interposed between a pair of electrodes. In the element of this patent, a resin film, for example, polyester, $CaF_2$, $SiO_2$, $MgF_2$ and the like is used as the current carrier permeable insulator. However, these materials are often not satisfactory for practical use in view of the inferiority in the electrochromic efficiency, the displayed color density and the response time. In these points, there still exist room for further improvement in the electrochromic device. The term "electrochromic efficiency" as used herein means a proportional constant between the variation in color density and the quantity of injected charge since the variation in the color density in this element is determined by the quantity of the charge injected to this element (IEEE Transaction On Electron Devices, Vol. ED-22, No. 9, 1975, p. 749, "Performance characteristics of electrochromic displays," Ifay F. Chang and Webster E. Howard).

SUMMARY OF THE INVENTION

It is a primary object of the present invention to provide an electrochromic device for use in a display device utilizing an element which exhibits the electrochromic phenomenon, in which the electrochromic efficiency has been improved so as to achieve high density electrochromy or color development in an extremely short period of time.

It is another object of the present invention to provide an electrochromic device capable of displaying light information in the form of a color developed image with high resolution.

It is still another object of the present invention to provide an electrochromic device which provides good "appearance" of the image display.

According to the present invention, there is provided an electrochromic device which comprises an electrochromic layer comprising a transition metal compound sandwiched in between a first auxiliary electrochromic layer and a second auxiliary electrochromic layer, each of the auxiliary electrochromic layers comprising at least one metal compound containing at least one metal different from the metal in the transition metal compound in the electrochromic layer, and the difference in electro-negativity between both metals being not more than 0.4.

BRIEF DESCRIPTION OF THE DRAWINGS

FIGS. 1, 2 and 3 schematically illustrate the structure of the electrochromic device of the present invention.

DESCRIPTION OF THE PREFERRED EMBODIMENTS

Figure 3:
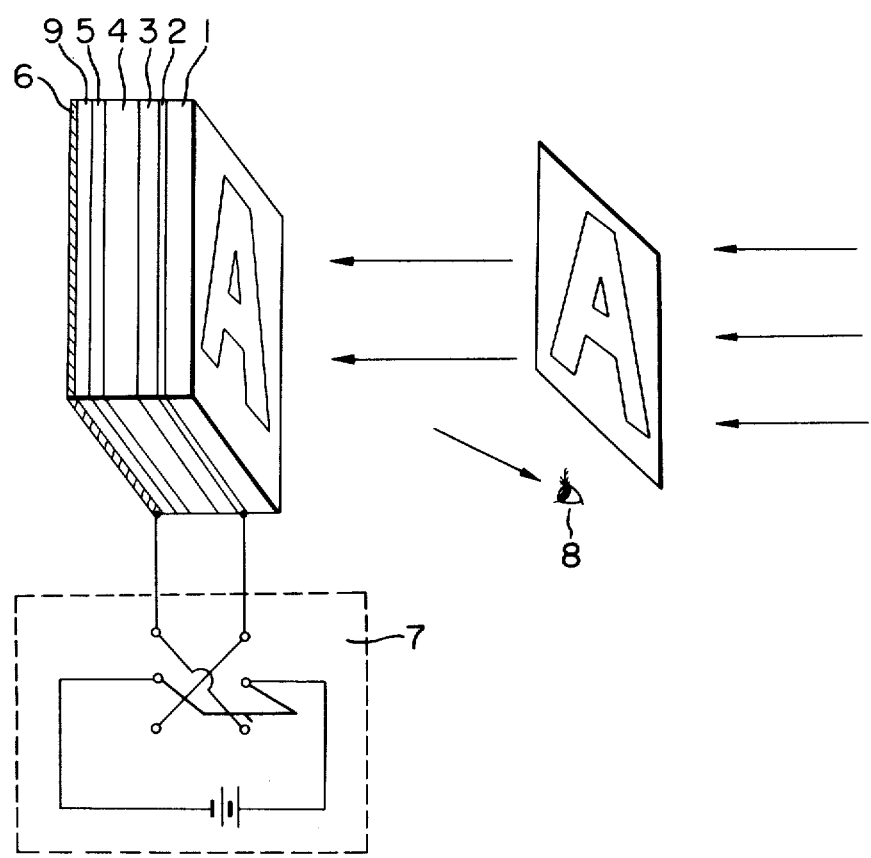

Referring to FIG. 1, which is a sectional view of one embodiment of the electrochromic device according to the present invention, the construction of the element is such that an electrochromic layer 4 is interposed between two auxiliary electrochromic layers 3 and 5 and the structure of the three layers 3, 4 and 5 is further interposed between a light transmitting electrode 2 formed on a light transmitting base 1 and an opposing electrode 6. The light transmitting base 1 may be used if desired, and it is generally used for the purpose of protecting the surface of the electrochromic element. A component 7 enclosed by a dash line schematically shows an electrical circuit for the electrochromic device. In the element shown in FIG. 1, at least the components 1, 2 and 3 are all made light transmissive in order that observation can be made from the point 8.

The light transmitting base 1 is not essential for the electrochromic device of the present invention, but it is used for the purpose of retaining the stable structure of the electrochromic element and protecting the surface layer (the outermost layer) from physical damage. As the material of the light transmitting base, there may be mentioned various kinds of glass, quartz, resin film and the like.

For the light transmitting electrode, there may be used a light transmitting film of an electrically conductive metal oxide such as tin oxide, indium oxide and the like: a semi-light-transmitting metal thin film; a metal thin film provided thereon with a reflection reducing coating; an electrically conductive transparent resin film and the like. The light transmitting film of the electrically conductive metal oxide may be used in a form of a vapor-deposited film.

When a light transmitting film of electrically conductive metal oxide is used, there has been reported a problem. The film, itself, takes part in the electrochromic phenomenon. As a result of which, when a display device (of a type wherein the auxiliary electrochromic layer is directly laminated on the light transmitting film of the electrically conductive metal oxide) is to be operated, unnecessary coloring (color formation) and decoloring are repeated. This causes undesirable color to remain and bring about lowering in the intended performance in display. In view of such deficiency, it is advantageous for the purpose of the present invention to use a metal thin film provided with the reflection reducing coating.

For the metal thin film, a vapor-deposited film of a substantially chemically inert metal such as gold (Au), palladium (Pd) and other precious metals, may be preferably used. The optimum film thickness may range from 50 to 200 angstroms based on the electrical resistance and light absorbing characteristic of the metal film.

For the reflection reducing coating, there may be used such compounds as, for example, ZnS, $ZrO_2$, $TiO_2$, SiO, $SiO_2$, $Nb_2O_5$, MgO, $MgF_2$, $CaF_2$, $Al_2O_3$, $Bi_2O_3$, $CeO_2$ and so on. These compounds are formed into a thin film having a refractive index of from 1.3 to 3.0 and a thickness of from 100 to 1200 angstroms. When the refractive index of the thin film is 2.0, the optimum film thickness may range from 400 to 600 angstroms, whereby the reflectance can be reduced from 30% to 5%.

Thus, by reducing or minimizing deterioration in the electrode element to increase the number of times for repeated use of the device and by reducing the surface reflection, the so-called "appearance" of the display can be improved.

The material constituting another electrode 6 opposing to the light transmitting electrode 2 is not particularly limited. That is, when the display device of a reflection type is to be constructed, a metal, for example, silver (Ag) and aluminum (Al) may be used.

The electrochromic layer 4 for use in the present invention may be formed from a transition metal compound and may be preferably formed by vapor-depositing $WO_3$, $MoO_3$, $TiO_2$, $Nb_2O_5$, $Ta_2O_5$ or $V_2O_5$ in a film thickness ranging from 500 angstroms to 10 μm (preferably from 200 angstroms to 1 μm) from the standpoint of the electrochromic efficiency based on interrelationship with the material to be used for the auxiliary electrochromic layer.

The auxiliary electrochromic layers 3 and 5 for use in the present invention may be formed from at least one kind of metal compound containing at least one metal element, for example Zn, Ta, Zr, Nb, V, Ag, Sr, Ti, etc. which is different from the metal element contained in the transition metal compound constituting the electrochromic layer. In addition, the difference in the electronegativity between the metal element of the metal compound for the auxiliary electrochromic layer and the metal element of the transition metal compound for the electrochromic layer is not more than 0.4. The term "electro-negativity" as used herein has been well defined by Pauling in his article titled "The Nature of Chemical Bond," published from Cornell Univ. Press, N.Y., 1960. As examples of the metal compound for the auxiliary electrochromic layers, there may be mentioned ZnO, $ZrO_2$, $Ta_2O_5$, $Nb_2O_5$, $V_2O_5$, $TiO_2$, $ZrO_2(+Y_2O_3)$, $BaTiO_3$, $CaTiO_3$, $SrTiO_3$, AgI, $Ag_2S$, AgSI, $Ag_3SBr$, $Ag_6I_4WO_4$, $\beta$-$Al_2O_3$, ZnS, $In_2O_3$, $SnO_2$ and the like which are verified to be particularly effective for the purpose of the present invention. The auxiliary electrochromic layer may be formed by vapor-depositing the above-mentioned metal compound, or coating a mixture of the metal compound and an appropriate binder in a film thickness of from 100 angstroms to 10 μm. Particularly, when it is formed by vapor-deposition, a film thickness of from 1000 anstroms to 1 μm is preferable.

One embodiment of a device, in which the electrochromic device of the present invention is applied to develop a recorded and displayed light image, will be explained with reference to FIG. 2. As seen from the drawing, the structure of the element is the same as that shown in FIG. 1 with the exception that a photo-semiconductive layer 9 is further added. The photosemiconductive layer 9 is not limited only to the substance whose electrical conductivity varies by visible light rays, but the substance whose electrical conductivity varies by irradiation of light in other wavelength region, for example, ultraviolet rays and infrared rays may be also used. For example, oxides, sulfides and selenides of zinc (Zn) and cadmium (Cd) may be used for this purpose. With respect to other components than the photo-semiconductive layer, the explanation about the element shown in FIG. 1 is applicable thereto.

In the present invention, all of the components of the element may be made light transmissive. For example, the auxiliary electrochromic layer 5 is simultaneously provided with the light diffusion property to prevent the color of the photo-semiconductive layer 9 from appearing as a color of the background seen from the observer 8 side. As a result, the so-called "Appearance" in display can be improved. Further, for example, when the auxiliary electrochromic layer 5 is formed so as to have a light intercepting property, the photo-semiconductive layer 9 can be prevented from being adversely affected by an external light from the observer 8 side and an excellent image of a better S/N ratio can be recorded and displayed.

In FIG. 2, the so-called light transmission type display device has been exemplified. It should, however, be noted that the reflection type device is also within the scope of the present invention. That is, input of a light image may be carried out from the observer 8 side as shown in FIG. 3.

In one embodiment of the display device wherein the direction of the incident light pattern of an image formation is the same as that of the observation of the displayed image (the reflection type display device) attention should be given to the display operation so that the light information alone is inputted in the dark room, and the wavelength range of an inputted light is set at a range outside the visible wavelength region, and so on. In view of such requirements, another embodiment of the device (wherein the direction of inputting an information is opposed to that of observing the displayed image to carry out the display operation), the light transmission type display-device) is considered advantageous. Even in this case, however, attention must be given as to minimizing the amount of incident light onto the background since the contrast in the displayed image is inconveniently lowered if the components of the device are all light transmissive. In such case, favorable results can be obtained when a mixture consisting of the effective component constituting any of the electrochromic layer, the auxiliary electrochromic layer and the photo-semiconductive layer and a binder is coated in a film thickness of 1 μm to 100 μm so that any of those layers may have the light-intercepting property.

The invention will be understood more readily by reference to the following examples. However, these examples are intended to illustrate the invention and are not to be construed to limit the scope of the present invention. In the following examples, quantity of electric current applied is an amount of charge to produce color.

EXAMPLE 1

As a reflection reducing coating, ZnS was vapor-deposited in the thickness of 400 Å on a glass plate, and then Au (80 Å thick), $BaTiO_3$ (3000 Å thick), and $WO_3$ (6000 Å) were subsequently vapor-deposited on the ZnS film by using an electron beam. Then, 10 parts by weight of $In_2O_3$ and 2 parts by weight of ethyl cellulose were mixed, dispersed and coated on the $WO_3$ film in the thickness of 20 μm (after dried), and finally a pair of electrodes (Au, 1 cm.×1 cm.) were formed by vapor-deposition in the thickness of 250 Å on both sides of the member as obtained above to produce an electrochromic element. When electric current was applied across the gold electrodes in such a manner that the electrode at the $BaTiO_3$ layer side is positive in polarity, a blue-colored pattern corresponding to the electrode pattern was observed on the white background. This colored pattern still remained on the background even after electric current is turned off, and when electric current was applied in a way opposite to the above as to polarity, the colored pattern was extinguished. Variations in color density in the coloring and decoloring steps as above with respect to the quantity of electric current applied (mA.sec./cm$^2$) to this element are as shown in the following table.

|  | Coloring step → | | | | | | Decoloring step → | | | | | |
|---|---|---|---|---|---|---|---|---|---|---|---|---|
| Quantity of Electric Current Applied (mA.sec./cm$^2$) | 2 | 4 | 6 | 8 | 9 | 12/0 | 2 | 4 | 6 | 8 | 10 | 12 |
| Density | 0.07 | 0.13 | 0.18 | 0.24 | 0.27 | 0.30 | 0.15 | 0.04 | 0.02 | 0.01 | 0.01 | 0.00 |

The density in the above table is determined by setting the density at the non-colored state as 0 and when the reflectance becomes 1/10 and 1/100, the density is set as 1.0 and 2.0, respectively.

EXAMPLE 2

Repeating the procedure of Example 1 except that each of the materials in the following table was employed in place of $BaTiO_3$, there was produced an electrochromic element, to which was applied electric current. Thus, there was formed a blue-colored pattern in each case.

Variations in color density with respect to the quantity of electric current applied (mA.sec./cm$^2$) are as shown in the following table.

| Element Model No. | Material substituted for BaTiO$_3$ | Quantity of electric current applied (mA.sec./cm$^2$) | Coloring step | | | | | | Decoloring step | | | | | |
|---|---|---|---|---|---|---|---|---|---|---|---|---|---|---|
|  |  |  | 2 | 4 | 6 | 8 | 10 | 12/0 | 2 | 4 | 6 | 8 | 10 | 12 |
| 2-1 | V$_2$O$_5$ |  | 0.09 | 0.18 | 0.29 | 0.40 | 0.51 | 0.62 | 0.30 | 0.13 | 0.03 | 0.01 | 0.01 | 0.01 |
| 2-2 | TiO$_2$ |  | 0.15 | 0.25 | 0.37 | 0.46 | 0.53 | 0.57 | 0.38 | 0.25 | 0.06 | 0.00 | — | — |
| 2-3 | Nb$_2$O$_5$ |  | 0.10 | 0.38 | 0.46 | 0.55 | 0.58 | 0.60 | 0.50 | 0.34 | 0.31 | 0.31 | 0.31 | 0.31 |
| 2-4 | CaTiO$_3$ |  | 0.04 | 0.08 | 0.10 | 0.12 | 0.14 | 0.15 | 0.10 | 0.07 | 0.03 | 0.00 | — | — |
| 2-5 | SrTiO$_3$ |  | 0.07 | 0.10 | 0.11 | 0.12 | 0.13 | 0.13 | 0.04 | 0.01 | 0.00 | — | — | — |
| 2-6 | (Ta$_2$O$_5$ + zrO$_2$)*$^1$ |  | 0.35 | 0.60 | 0.82 | 1.04 | 1.19 | 1.35 | 0.99 | 0.70 | 0.45 | 0.15 | 0.01 | 0.00 |
| 2-7 | (CaTiO$_3$ + SrTiO$_3$)*$^2$ |  | 0.11 | 0.16 | 0.20 | 0.23 | 0.24 | 0.25 | 0.12 | 0.07 | 0.02 | 0.00 | — | — |
| 2-8 | (ZrO$_2$ + Y$_2$O$_3$)*$^3$ |  | 0.26 | 0.46 | 0.58 | 0.71 | 0.83 | 0.90 | 0.73 | 0.50 | 0.24 | 0.02 | 0.00 | — |
| 2-9 | ZrO$_2$ |  | 0.27 | 0.48 | 0.62 | 0.75 | 0.88 | 0.94 | 0.83 | 0.58 | 0.38 | 0.14 | 0.00 | — |
| 2-10 | Ta$_2$O$_5$ |  | 0.35 | 0.58 | 0.75 | 0.92 | 1.11 | 1.23 | 0.99 | 0.80 | 0.56 | 0.20 | 0.02 | 0.00 |

-continued

| Element Model No. | Material substituted for BaTiO$_3$ | Quantity of electric current applied (mA.sec./cm$^2$) | Coloring step | | | | | | Decoloring step | | | | | |
|---|---|---|---|---|---|---|---|---|---|---|---|---|---|---|
| | | | 2 | 4 | 6 | 8 | 10 | 12/0 | 2 | 4 | 6 | 8 | 10 | 12 |
| 2-11 | CaF$_2$*4 | | 0.03 | 0.05 | 0.07 | 0.09 | 0.10 | 0.10 | 0.08 | 0.05 | 0.02 | 0.00 | — | — |

*1 A mixture of Ta$_2$O$_5$ and ZrO$_2$ (1 mole : 3 moles).
*2 A mixture of CaTiO$_3$ and SrTiO$_3$ (1 mole : 1 mole).
*3 ZrO$_2$ containing 15% by weight of Y$_2$O$_3$.
*4 Cited for reference though this material is not within the scope of the present invention.

Further, for reference, electrochromic elements were produced by omitting the coating of a mixture of InO$_3$ and ethyl cellulose in each of the element in Example 1 and element model Nos. 2-1 through No. 2-10. The relation of the quantity of electric current applied (mA.-sec./cm$^2$) and the color density change as to the above samples is as shown in the following table.

| Comparative Element Model No. | Corresponding element | Quantity of electric current applied (mA.sec./cm$^2$) | Coloring step → | | | | | | Decoloring step → | | | | | |
|---|---|---|---|---|---|---|---|---|---|---|---|---|---|---|
| | | | 2 | 4 | 6 | 8 | 10 | 12/0 | 2 | 4 | 6 | 8 | 10 | 12 |
| 01 | Example 1 | | 0.06 | 0.09 | 0.12 | 0.15 | 0.18 | 0.20 | 0.12 | 0.03 | 0.02 | 0.01 | 0.00 | — |
| 02 | No. 2 - 1 | | 0.08 | 0.12 | 0.22 | 0.31 | 0.40 | 0.50 | 0.24 | 0.10 | 0.02 | 0.00 | — | — |
| 03 | No. 2 - 2 | | 0.10 | 0.20 | 0.29 | 0.36 | 0.40 | 0.43 | 0.30 | 0.18 | 0.05 | 0.00 | — | — |
| 04 | No. 2 - 3 | | 0.13 | 0.28 | 0.35 | 0.40 | 0.47 | 0.31 | 0.40 | 0.32 | 0.30 | 0.30 | 0.30 | 0.30 |
| 05 | No. 2 - 4 | | 0.04 | 0.07 | 0.10 | 0.11 | 0.12 | 0.13 | 0.11 | 0.08 | 0.05 | 0.02 | 0.00 | — |
| 06 | No. 2 - 5 | | 0.05 | 0.08 | 0.11 | 0.12 | 0.13 | 0.13 | 0.05 | 0.01 | 0.00 | — | — | — |
| 07 | No. 2 - 6 | | 0.22 | 0.40 | 0.58 | 0.69 | 0.75 | 0.80 | 0.65 | 0.41 | 0.19 | 0.02 | 0.00 | — |
| 08 | No. 2 - 7 | | 0.08 | 0.10 | 0.12 | 0.13 | 0.14 | 0.15 | 0.08 | 0.03 | 0.01 | 0.00 | — | — |
| 09 | No. 2 - 8 | | 0.19 | 0.33 | 0.40 | 0.50 | 0.59 | 0.65 | 0.41 | 0.20 | 0.02 | 0.00 | — | — |
| 010 | No. 2 - 9 | | 0.20 | 0.35 | 0.46 | 0.51 | 0.56 | 0.60 | 0.44 | 0.25 | 0.02 | 0.00 | — | — |
| 011 | No. 2 - 10 | | 0.22 | 0.40 | 0.53 | 0.64 | 0.73 | 0.80 | 0.63 | 0.50 | 0.22 | 0.03 | 0.00 | — |

The above results show that the electrochromic element according to the present invention gives improved electrochromic efficiency.

EXAMPLE 3

Repeating the procedure of Example 1 except that AgI, Ag$_2$S, Ag$_3$SBr, and Ag$_6$I$_4$WO$_4$ are used in place of BaTiO$_3$, respectively, there was obtained each electrochromic element, which could be colored and decolored in a way similar to Example 1.

EXAMPLE 4

Au was vapor-deposited on a glass plate in the thickness of 80 Å as an electrode, and then In$_2$O$_3$ was laminated on the Au layer in the thickness of 1000 Å by Radio-frequency sputtering, and further, WO$_3$ (3000 Å in thickness) and BaTiO$_3$ (3000 Å in thickness) were vapor-deposited subsequently by electron beam, and finally Au was vapor-deposited as an opposite electrode in the thickness of 80 Å in a pattern of 1 cm. X 1 cm. and then ZrO$_2$ was vapor-deposited thereon in the thickness of 520 Å to form a reflection reducing coating. In the above, all the layers are light transmissive. Electric current was applied across both electrodes with a negative polarity at the In$_2$O$_3$ layer side and there was formed a blue-colored pattern corresponding to the electrode pattern of 1 cm. X 1 cm. This pattern still remained even after electric current was turned off, and was extinguished by applying an electric current of an opposite polarity.

EXAMPLE 5

An Au film of 80 Å thick was formed as a semi-transparent electrode, and Ta$_2$O$_5$ (1000 Å in thickness) and WO$_3$ (2000 Å in thickness) were vapor-deposited subsequently, and a coating composition containing 10 parts by weight of SnO$_2$ and 1 part by weight of styrene-butadiene copolymer mixed and dispersed was coated thereon in the thickness of 5 μm (after dried), and further a mixture of 10 parts by weight of CdS and 2 parts by weight of ethyl cellulose was coated thereon in the thickness of 20 μm (after dried) and finally, aluminum was vapor-deposited in the thickness of 150 Å to form an opposite electrode of semitransparency.

A light image was formed on the photo-semiconductive layer, i.e. the layer containing CdS above, of the electrochromic element, and electric current was applied with a negative polarity at the aluminum electrode side by impressing a voltage of 20 V across the electrodes to produce a blue-colored pattern corresponding to the light pattern. The blue-colored pattern still remained even after projection of the light image and impression of the voltage were stopped. When a light was projected to the whole surface of the electrochromic element and a voltage of 20 V was impressed across the electrodes with a positive polarity at the aluminum electrode side, the blue-colored pattern rapidly disappeared.

Repeating the above procedure except that the layer of a mixture of SnO$_2$ and a styrene-butadiene copolymer was not formed, the resulting electrochromic element was subjected to the same coloring and decoloring test as above, and it was found that the time required for obtaining the same color density as above was about twice the time required in the above.

EXAMPLE 6

As a semi-transparent electrode, Au was made into a film of 80 Å thick, and Ta$_2$O$_5$ (1000 Å in thickness) and MoO$_3$ (2000 Å in thickness) were vapor-deposited subsequently, and further a coating material composed of 10 parts by weight of ZnS and 1 part by weight of styrene-butadiene copolymer mixed and dispersed was applied in the thickness of 5 μm (after dried). Further, a mixture of 10 parts by weight of CdS and 2 parts by weight of ethyl cellulose was applied in the thickness of 20 μm (after dried). Finally, aluminum was vapor-deposited in the thickness of 100 Å as a semi-transparent opposite electrode.

On the photo-semiconductive layer (the layer containing CdS) of the resulting electrochromic element there was formed a light image and a voltage of 20 V was impressed across the electrodes with the aluminum electrode of negative polarity to flow electric current. Then, a blue-colored pattern corresponding to a pattern of the light image was formed. This colored pattern still remained even after projection of the light image and impression of voltage were stopped. When a light was projected to the whole surface of the element and a voltage of 20 V was applied with the aluminum electrode of a positive polarity, the colored pattern was rapidly extinguished.

Repeating the above procedure except that $TiO_2$ layer of 2000 Å thick was used in place of the $MoO_3$ layer, there were observed coloring and decoloring similar to those in above.

EXAMPLE 7

A glass plate was coated with a semi-transparent film of Au of 80 Å thick, and $ZrO_2$ (2000 Å thick) and $WO_3$ (3000 Å thick) were subequently vapor-deposited by electron beam. And then a coating material produced by mixing and dispersing 5 parts by weight of $In_2O_3$, 5 parts by weight of ZnO, and 2 parts by weight of ethyl cellulose in ethanol was applied to the laminate as obtained above and dried in the thickness of 10 μm.

As a photo-semiconductive layer, a mixture of 5 parts by weight of CdS and 1 part of ethyl cellulose was coated in the thickness of 8 μm on the surface of the layer as obtained above, and then a semi-transparent film of Ag was vapor-deposited thereon as an opposite electrode in the thickness of 100 Å. As illustrated in FIG. 2, a light image was projected from the Ag electrode side and a voltage of 10 V was impressed with the Ag electrode of a negative polarity and a blue-colored image corresponding to the light image was formed in two seconds. This colored image still remained even after application of light and electric current was stopped. When a light was applied to the whole surface of the element and a voltage of 10 V was impressed across the electrodes in such a way that the Ag electrode was positive, the image disappeared rapidly. The layer containing $In_2O_3$ and ZnO has a light diffusion property and furthermore renders the orange ground of CdS white to improve the "appearance". Specific resistance of this layer is about $10^6$ ohm.cm and the resistance in the film surface direction is sufficiently high, and the resolving power was 30 lines/mm.

The relation between change of the quantity of electric current applied and change of the colored density was as shown below.

| Quantity of electric current applied (millicoulomb/cm$^2$) | 1 | 2 | 5 | 10 | 20 | 50 | 100 | 1000 |
|---|---|---|---|---|---|---|---|---|
| Density | 0.2 | 0.3 | 0.6 | 0.9 | 1.3 | 1.6 | 2.1 | 2.1 |

The value of density was determined by setting the values at 1.0 and 2.0 when reflectances are 10% and 1%, respectively.

A comparative element was prepared by omitting the coating layer containing a mixture of $In_2O_3$, ZnO and ethyl cellulose in the above element in this example. The relation of quantity of electric current applied and density as to said comparative element is as shown below.

| Quantity of electric current applied (millicoulomb/cm$^2$) | 1 | 2 | 5 | 10 | 20 | 50 | 100 | 1000 |
|---|---|---|---|---|---|---|---|---|
| Density | 0.1 | 0.2 | 0.4 | 0.7 | 1.0 | 1.5 | 2.0 | 2.0 |

The density is determined as shown above.

EXAMPLE 8

Between the coating layer containing a mixture of $In_2O_3$, ZnO and ethyl cellulose and the photo-semiconductive layer of the element of Example 7, there was formed a layer produced by coating a coating material containing one part by weight of carbon powder and 4 parts by weight of ethyl cellulose in the thickness of 10 μm (after it dried). The resulting element was irradiated by a light image from the Ag electrode side while a voltage of 15 V was impressed with the Ag electrode of a negative polarity, and a blue-colored image was formed in one second. The present element was not affected at all by an outside light from the observer side and contrast of the colored image was high as compared with the element of Example 7. This may be attributable to the light intercepting property of the coating layer of carbon powder and ethyl cellulose. When the intensity of a light image projecting light is similar to that of an outside light, the light intercepting layer is very effective. When a mixture of $MnO_2$ and a binder resin or a mixture of CuO and a binder resin was used in the above example in place of the mixture of carbon powder and ethyl cellulose (binder), a similar result was obtained.

EXAMPLE 9

On a glass plate were vapor-deposited ZnS by electron beam in the thickness of 450 Å and Au in the thickness of 100 Å by a resistance heating Mo boat, and then $ZrO_2$ (3000 Å thick) and $WO_3$ (6000 Å thick) were subsequently vapor-deposited by electron beam, and further a mixture of 6 parts by weight of $In_2O_3$, 4 parts by weight of ZnO and one part by weight of styrene-butadiene copolymer was coated thereon in the thickness of 10 μm and dried. In addition, a mixture of 10 parts by weight of ZnO dye-sensitized by Rose Bengal and 1 part by weight of ethyl cellulose was applied thereto in the thickness of 15 μm, and an aluminum electrode was formed by vapor-deposition thereon.

A light was projected from the glass plate side while a voltage of 10 V was impressed across the Au and Al electrodes in such a way that the Au electrode is positive, for 2 seconds. There was formed a blue-colored image corresponding to the light image, which still remained even after the application of light and voltage was stopped. When a light was projected to the whole surface of the element and a voltage of 10 V with a polarity opposite to that as above was impressed, the colored image disappeared rapidly.

Another element was prepared by omitting the ZnS layer in the above mentioned electrochromic element, and the parallel reflectance was measured from the glass plate side and compared with the above mentioned element.

When the ZnS layer was not present, the parallel reflectance was 35% while the parallel reflectance was 5% and the "appearance" was improved to a great extent when the ZnS layer was present.

Further there were prepared two samples by substituting $In_2O_3$ (containing 5 wt.% of $SnO_2$) and $SnO_2$ (containing 5 wt.% of $Sb_2O_3$) as transparent electroconductive film, respectively, for the ZnS, Au layer in the electrochromic element mentioned at the beginning of this example.

When a colored image was formed in each of the two samples and then an opposite electric field was applied for extinguishing the colored image, a brown image remained corresponding to the colored image previously formed, and it could not be completely extinguished. This results because $In_2O_3$ and $SnO_2$ themselves were colored by the application of electric current, and it is difficult to form another light image clearly on the same element.

On the contrary, when the electrochromic element having a ZnS, Au layer is used as an electrode, the Au is not colored by applying electric current so that the formed color can be extinguished completely. And even after coloring and decoloring of different images were repeated more than 1000 times, no degradation of the element was observed.

EXAMPLE 10

Selenium was vapor-deposited in a glass-like form on a Nesa electrode, and a coating material produced by pulverizing $\beta$-$Al_2O_3$ sufficiently and dispersing the finely divided $\beta$-$Al_2O_3$ in an alcohol containing 10% ethyl cellulose was applied to the selenium layer in the thickness of 5 $\mu$m and dried. $MoO_3$ was vapor-deposited in the thickness of 6000 Å thereon by using electron beam and then ZnS was vapor-deposited thereon for reflection preventing in the thickness of 2000 A. Finally, as an electrode, Au was vapor-deposited, and then a polyethyleneterephthalate film was adhered thereto. The resulting electrochromic element was subjected to coloring and decoloring steps in a way similar to Example 9. The results were similar to those in Example 9.

EXAMPLE 11

An electrochromic element was produced by substituting a mixture of 5 parts by weight of ZnO and 1 part of a phenolic resin of novolak type for the layer containing $In_2O_3$ and ZnO in Example 7. The resulting electrochromic element showed electrochromic behavior almost similar to that of Example 7.

What is claimed is:

1. An electrochromic device which comprises an electrochromic layer comprising a transition metal compound sandwiched in between a first auxiliary electrochromic layer and a second auxiliary electrochromic layer, and each of the auxiliary electrochromic layers comprising at least one metal compound containing at least one metal different from the metal in the transition metal compound in the electrochromic layer, and the difference in electro-negativity between both metals being not more than 0.4 the thus sandwiched electrochromic layers being further sandwiched between opposed counter electrodes, at least one of said counter electrodes being light transmissive and each of said counter electrodes directly contacting the auxiliary electrochromic layer being a metallic electrode and electric current necessary for color forming of the electrochromic layer being capable of flowing through both auxiliary electrochromic layers.

2. An electrochromic device according to claim 1 in which the metal compounds contained in the first and the second auxiliary layer are similar or dissimilar and selected from the group consisting of ZnO, $ZrO_2$, $Ta_2O_5$, $Nb_2O_5$, $V_2O_5$, $TiO_2$, $BaTiO_3$, $CaTiO_3$, $SrTiO_3$, $ZrO_2$ containing $Y_2O_3$, AgI, $Ag_2S$, AgSI, $Ag_3SBr$, $Ag_6I_4WO_4$, beta $Al_2O_3$, ZnS, $In_2O_3$, $SnO_2$ and mixtures thereof.

3. An electrochromic device according to claim 1 in which the electrochromic layer contains a member selected from the group consisting of $WO_3$, $MoO_3$, $TiO_2$, $Nb_2O_5$, $Ta_2O_5$ and $V_2O_5$.

4. An electrochromic device according to claim 1 in which one of the first and the second auxiliary electrochromic layers is composed of a vapor-deposited film containing the metal compound and the other is composed of a coating film of a mixture composed of the metal compound dispersed in a binder.

5. An electrochromic device according to claim 1 in which the electrochromic layer is 500 Å — 10 $\mu$m in thickness.

6. An electrochromic device according to claim 1 in which the electrochromic layer is 2000 Å — 1 $\mu$m in thickness.

7. An electrochromic device according to claim 1 in which the first auxiliary electrochromic layer and the secondary auxiliary electrochromic layer are 100 Å — 20 $\mu$m in thickness.

8. An electrochromic device according to claim 1 in which one of the first and the second auxiliary electrochromic layers is a vapor-deposited film of 1000 Å — 1 $\mu$m thick.

9. An electrochromic device according to claim 1 in which the electrochromic layer, the first and the second auxiliary electrochromic layers, and the both electrodes are light transmissive.

10. An electrochromic device according to claim 1 in which at least one of the electrodes is a metal thin film having a reflection reducing coating.

11. An electrochromic device according to claim 1 in which a photo-semiconductive layer is added.

12. An electrochromic device according to claim 11 in which the photo-semiconductive layer contains a member selected from the group of ZnO and CdS.

13. An electrochromic device according to claim 11 in which the photo-semiconductive layer is a coating composed of a binder and a member selected from the group consisting of ZnO and CdS.

14. An electrochromic device according to claim 10 in which the reflection reducing coating is a metal compound thin film having a refractive index of 1.3–3.0 and is 100–1200 Å in thickness.

15. An electrochromic device which comprises an electrochromic layer of 400 Angstroms to 10 microns in thickness comprising a transitional metal compound, said electrochromic layer sandwiched between a first auxiliary electrochromic layer and a second auxiliary electrochromic layer, each of the auxiliary electrochromic layers comprising at least one metal compound selected from the group consisting of ZnO, $ZrO_2$, $Ta_2O_5$, $Nb_2O_5$, $V_2O_5$, $TiO_2$, $BaTiO_3$, $CaTiO_3$, $SrTiO_3$, $ZrO_2$ containing $Y_2O_3$, AgI, $Ag_2S$, AgSI, $Ag_3SBr$, $Ag_6I_4WO_4$, beta-$Al_2O_3$, ZnS, $In_2O_3$, $SnO_2$ and mixtures thereof, such that the metal of at least one metal compound in each such auxiliary electrochromic layer is different from the metal in the transition metal compound in the electrochromic layer, and the difference in the electronegativity between both metals being not more than 0.4, the thus sandwiched electrochromic layers being further sandwiched between opposed counter electrodes, at least one of said counter electrodes being light transmissive and each of said counter electrodes directly contacting the auxiliary electrochromic layer being a metallic electrode and electric current necessary for color forming of the electrochromic layer being capable of flowing through both auxiliary electrochromic layers.

16. An electrochromic device according to claim 15 in which at least one of the electrodes is a metal thin film having a reflection reducing coating.

17. An electrochromic device according to claim 15 in which a photo-semiconductive layer is added.

18. An electrochromic device according to claim 11 comprising a metal electrode, a first auxiliary electrochromic layer, an electrochromic layer, a second auxiliary electrochromic layer, a photo-conductive layer and a metal or metal oxide second electrode wherein at least one of said electrodes is light-transmissive.

19. An electrochromic device according to claim 17 comprising a metal electrode, a first auxiliary electrochromic layer, an electrochromic layer, a second auxiliary electrochromic layer, a photo-semiconductive layer and a metal or metal oxide second electrode wherein at least one of said electrodes is light-transmissive.

* * * * *